United States Patent
Pozzer et al.

(10) Patent No.: US 11,186,721 B2
(45) Date of Patent: Nov. 30, 2021

(54) PROCESS FOR TREATMENT OF NANOPARTICLES OF MINERAL FILLER FOR USE IN POLYMERIZATION IN THE PRESENCE OF NANOPARTICLES

(71) Applicant: Braskem S.A., Camacari (BR)

(72) Inventors: Dihogenes Adriano Pozzer, Sao Paulo (BR); Olavo Martins Junior, Sao Paulo (BR); Alessandra Coelho Silva Lucas, Sao Paulo (BR); Fernando Silveira, Sao Paulo (BR)

(73) Assignee: Braskem S.A., Camaçari—BA (BR)

( * ) Notice: Subject to any disclaimer, the term of this patent is extended or adjusted under 35 U.S.C. 154(b) by 1004 days.

(21) Appl. No.: 15/540,513

(22) PCT Filed: Dec. 29, 2014

(86) PCT No.: PCT/BR2014/050056
§ 371 (c)(1),
(2) Date: Jun. 28, 2017

(87) PCT Pub. No.: WO2016/106441
PCT Pub. Date: Jul. 7, 2016

(65) Prior Publication Data
US 2018/0002529 A1 Jan. 4, 2018

(51) Int. Cl.
*C09C 1/42* (2006.01)
*C08K 3/013* (2018.01)
(Continued)

(52) U.S. Cl.
CPC ............... *C09C 1/42* (2013.01); *B82Y 30/00* (2013.01); *C08K 3/013* (2018.01); *C08K 9/04* (2013.01);
(Continued)

(58) Field of Classification Search
CPC .. C09C 1/42; C09C 1/44; C08K 3/013; C08K 9/04; B82Y 30/00; B82Y 40/00;
(Continued)

(56) References Cited

U.S. PATENT DOCUMENTS

| 5,883,173 A | 3/1999 | Elspass et al. |
| 6,403,231 B1 * | 6/2002 | Mueller .................. B32B 27/20 |
| | | 428/338 |

(Continued)

FOREIGN PATENT DOCUMENTS

WO 99/47598 9/1999

*Primary Examiner* — Pegah Parvini
(74) *Attorney, Agent, or Firm* — Duane Morris LLP

(57) ABSTRACT

A process for treatment of nanoparticles of mineral filler for obtaining processed nanoparticles for use in polymerization in the presence of nanoparticles which includes the steps of (a) drying a mineral filler with an inert gas to remove catalyst poisons; (b) mixing the mineral filler dried obtained in step (a) with a swelling agent in a liquid state or near a critical state or in the supercritical state; (c) subjecting the swelling agent of the mixture obtained in step (b) to an endoenthalpic or isoentalphic phase change by altering the conditions of the temperature and/or pressure; (d) subjecting the nanoparticles of the mixture obtained in step (c) to contact of scavenging agent to react with catalyst poisons; then the mixture obtained in step (d) can be dried in a step (e) with an inert gas to remove sub-products from scavenging agent and catalyst poisons to obtain the treated nanoparticles.

24 Claims, 2 Drawing Sheets

(51) Int. Cl.
*C08K 9/04* (2006.01)
*C09C 1/44* (2006.01)
*B82Y 30/00* (2011.01)
B82Y 40/00 (2011.01)
C04B 33/04 (2006.01)

(52) U.S. Cl.
CPC ............ *C09C 1/44* (2013.01); *B82Y 40/00* (2013.01); *C04B 33/04* (2013.01); *Y02P 20/54* (2015.11); *Y10S 977/734* (2013.01); *Y10S 977/742* (2013.01); *Y10S 977/755* (2013.01); *Y10S 977/773* (2013.01); *Y10S 977/811* (2013.01); *Y10S 977/845* (2013.01); *Y10S 977/90* (2013.01)

(58) Field of Classification Search
CPC .. Y02P 20/544; Y10S 977/734; Y10S 977/90; Y01S 977/773; Y01S 977/811; Y01S 977/845; Y01S 977/90
See application file for complete search history.

(56) References Cited

U.S. PATENT DOCUMENTS

| | | | |
|---|---|---|---|
| 6,465,543 B1 * | 10/2002 | Alexandre | B82Y 30/00 523/213 |
| 6,649,713 B2 | 11/2003 | Tang et al. | |
| 7,776,943 B2 | 8/2010 | Scott et al. | |
| 8,058,371 B2 | 11/2011 | Brant et al. | |
| 8,080,610 B2 | 12/2011 | Kiss et al. | |
| 8,329,811 B2 | 12/2012 | Liberman et al. | |
| 2012/0059112 A1 * | 3/2012 | Luo | C08F 36/06 524/572 |
| 2014/0275347 A1 | 9/2014 | Nawani et al. | |

* cited by examiner

PROCESS FOR TREATMENT OF NANOPARTICLES OF MINERAL FILLER FOR USE IN POLYMERIZATION IN THE PRESENCE OF NANOPARTICLES

FIELD OF THE INVENTION

The present invention refers to a process for treatment of nanoparticles of mineral fillers for use in in situ continuous or batch polymerization process by means of a previously treatment process.

BACKGROUND OF THE INVENTION

Nanocomposites are materials formed by nanoparticles of inorganic material dispersed in an organic polymer matrix.

Organic polymer containing exfoliated lamella in nanometric scale exhibits enhanced macroscopic properties relative to virgin organic polymer or to conventional micro composite or macro composite containing other inorganic filler. Among the macroscopic properties that may be cited are mechanical properties, barrier properties, thermal and electrical conductivity and others. Various techniques have been used for the preparation of the composites, particularly in the field of the polyolefins, such as melt mixing, in situ polymerization using clays such montmorillonite and others as catalyst mechanical support and in situ polymerization adding mineral filler during the polymerization reaction.

Usually the clays are treated to remove adsorbed water for using in the in situ polymerization for nanocomposite preparation.

Water and other compounds containing hydroxyl groups are available in the nanofiller and act as a catalyst poison reducing catalyst activity in the polymerization of olefins. The catalysts used in the polymerization can be Ziegler-Natta, metallocene, chromium and others.

Organoaluminum co-catalysts, such as trialkylaluminum or an alkylaluminoxane, are generally used to react with the adsorbed water and with other compounds containing hydroxyl groups available on the surface of the nanofiller used as catalyst support.

For example, document U.S. Pat. No. 7,776,943 describes a process for the preparation of polyolefin nanocomposite by in situ polymerization in the presence of a catalyst-filler combination which comprises a nickel complex bearing α-iminocarboxamidato ligant combined with a layered inorganic silicate, in which a trimethylaluminum is used as a scavenger.

Document U.S. Pat. No. 6,649,713 describes a process for the preparation of polyolefin nanocomposite by in situ polymerization, using a organically modified clay in which silica or titanium dioxide nanometer particles are incorporated into the layers, alkylaluminum or alkoxyaluminum are added and a metallocene catalyst is then loaded on the above mentioned material and the finished catalyst is used for ethylene or propylene polymerization.

On the other hand, document U.S. Pat. No. 8,329,811 describes a process for polymerization in the presence of nanoparticles of a mineral filler for obtaining polymer nanocomposites which includes the steps of mixing a mineral filler with a swelling agent; subjecting the swelling agent to an endoenthalpic or isoenthalpic phase change promoting an exfoliation and polymerizing a monomer.

The interaction energies between layered mineral filler occur mainly by Van der Walls energy and electrostatic energy. Between macroscopic surfaces in liquids, Van der Walls forces become important at distances below 10-15 nm and may at these distances start to dominate interactions of different origins as described by Ruths and Israelachvili (Springer Handbook of Nanotechnology, 2nd Ed (2007) 886). According Berjaguin-Landau-Verwey-Overbeek (DLVO) theory, at a small separation the Van der Walls attraction between two planar surfaces wins out over the double-layer repulsion.

The usual mineral filler treatment using inert gas, as nitrogen or saturated hydrocarbon, combined or not with an organometallic compound as alkylaluminum or alkoxyaluminum is efficient only to remove the water and other compounds containing hydroxyl groups adsorbed in the surface of hydrophilic and organophilic phylosilicates. The attraction forces between macroscopic surfaces prevent that the inert gas or the organometallic compounds enter into the layers and react with the water and hydroxyl groups confined within the mineral fillers layers.

Various techniques have been used for obtaining nanoparticles of phyllosilicate or other spherical and sheet-like filler, such as mixing a surfactant compound, treating with a acid, mixing with a swelling agent in a liquid state or near a critical state or in the supercritical state subjecting the swelling agent to a phase change.

Usually for the preparation of nanocomposites, particularly in the presence of nanoparticles in the reaction media, surfactant is added to disrupt the layered structure. Document U.S. Pat. No. 5,883,173, for example, describes a process for preparation of nanocomposite material comprising a layered material intercalated with a latex by in situ polymerization in a mixture of surfactant, layered material, monomer, and a liquid is used in cases where the polymerization can occur in the presence of a polar liquid.

The use of surfactants in this case is undesirable since it limits the nanofiller application. Surfactans, for example, are catalyst poisons in olefins polymerization. Thus, nanofillers treated with surfactants are not adequate for the preparation of polyolefins.

Other technique to disrupt the layered structure is mixing the mineral filler with a swelling agent and subjecting the swelling agent to a phase change. For example, in document U.S. Pat. No. 8,329,811 there is described a process for the polymerization in the presence of nanoparticles of a mineral filler which includes steps of mixing a mineral fillers with a swelling agent in a liquid state or near a critical state or in the supercritical state, subjecting the swelling agent to an endoentalphic or isoenthalphic phase change by altering the conditions of temperature and/or pressure and polymerizing a monomer in the presence of mixture of swelling agent and mineral filler.

When the layered structure is disrupted water and other compounds containing hydroxyl groups confined in the mineral filler layers are exposed. Therefore, when the exfoliation of mineral and these nanofiller contact a catalyst in the reaction media the catalyst poison, theretofore confined within mineral filler, induce the catalyst deactivation. Then the more efficient is the exfoliation process, more catalyst poisons are exposed and lower is the catalyst yield.

As observed in the work described by Reddy and Kumar Das (Journal of Macromolecular Science. Part A. Pure Applied Chemistry. 43 (2006) 1369) fillers were heated and modified with MAO (methylaluminoxane) to minimize the deactivation effects of the surfaces on metallocene catalyst activity.

The process of the present invention overcomes the disadvantages of the processes known in the state of the art by disrupting the layered structure of a mineral filler in the presence of a scavenging agent. These treatment minimizes the deactivation effect caused by water and compounds containing hydroxyl groups in the Ziegler-Natta, metallocene, chromium and others catalyst activity.

The nanofillers obtained by the process of the present invention are suitable to be used in a wide range of polymerization processes, including the production of polyolefins.

SUMMARY OF THE INVENTION

The present invention relates to a process for treatment of mineral filler for obtaining treated nanoparticles for use in polymer nanocomposites process by in situ polymerization wherein a mineral filler is dried with an inert gas, to remove water and other compounds with hydroxyl groups on the surface of mineral filler. The dried mineral filler is contacted with swelling agent in liquid state or near the critical state or in the supercritical state. Subsequently, the mixture swelling agent-mineral fillers is subjected to isoenthalphic phase change (supercritical state) or endoenthalpic phase change (equilibrium state or supercritical state) of the swelling agent, by altering the conditions of the temperature and/or pressure for disrupt layered structure and expose catalyst poisons that may be confined within mineral filler layers. The mixture is then subjected to contact with a scavenging agent that react with catalyst poisons present in the mineral filler. The mixture obtained can then be subjected to a drying step with an inert gas to remove the sub-products from reaction of scavenger agent and catalyst poisons.

The nanoparticles obtained by the process of the present inventions can be used in the production of nanocomposites in in situ polymerization.

DETAILED DESCRIPTION OF THE INVENTION

The process of the present invention for treatment of nanoparticles of mineral filler comprises the steps of:

(a) Drying a mineral filler with an inert gas;

(b) Mixing the dried mineral filler obtained in step (a) with a swelling agent in a liquid state, or near a critical state or in supercritical state;

(c) Subjecting the swelling agent of the mixture obtained in step (b) to an endoenthalpic or isoenthalpic phase change, by altering the conditions of temperature and/or pressure;

(d) Subjecting the mixture obtained in step (c) to contact with a scavenging agent.

Optionally, it may occur a step (e) wherein the mixture obtained in step (d) is dried with an inert gas to remove sub-products from scavenging agent and catalyst poisons to obtain the treated nanoparticles. Preferably, step (e) occurs in the same conditions and uses the same inert gas of step (a).

Step (c) occurs preferably by transferring the mixture containing the mineral filler and the swelling agent from a first reactor to a second. The second reactor may be, optionally, a polymerization reactor.

Optionally, scavenging agent may also be present in at least one of steps (a), (b) or (c). Preferably, the scavenging agent is present in step (c).

Figure 1:
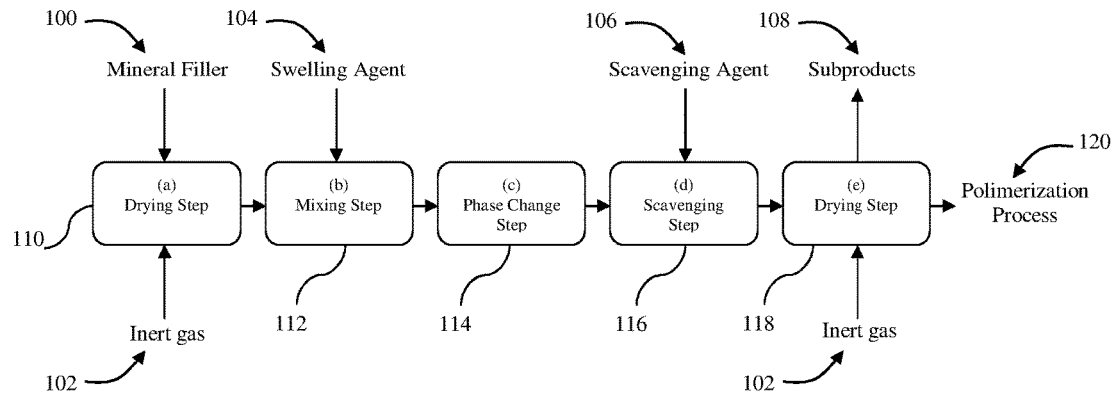
FIG. 1 shows the flowcharts depicting one method of treatment of mineral filler.

The treated nanoparticles obtained by the process of the present invention are suitable to be used in the preparation of polymer nanocomposites by in situ polymerization. Also, the nanoparticles obtained by the process of the present invention are suitable to be used in the preparation of polyolefin nanocomposites by in situ polymerization. The preparation of said nanocomposites can occur in continuous or batch polymerization process. FIG. 1 depicts one embodiment of the process of the present invention for treatment of nanoparticles of mineral filler for obtaining processed nanoparticles for the preparation of polymer nanocomposites by in situ polymerization.

Specifically, in this embodiment the spherical or layered mineral filler 100 is dried in a rotary dryers, or in a rolling bed dryer or in a fluidized bed dryer, with an inert gas 102 in box 110, step (a), at ambient or high temperature and positive or vacuum pressure for remove the catalyst poisons, as water and other compounds containing hydroxyl groups, available in the mineral filler surface. The drying step may occur, optionally, in presence of the scavenging agent.

The said dried mineral filler is mixed with a swelling agent 104 in liquid state or near the critical state or in the supercritical state, as shown in box 112, step (b), in a stirred reactor with continuous flow or in batches. The swelling agent being subsequently subjected to endoenthalpic or isoenthalpic phase change in box 114, step (c), to provide a nanometric filler. The endoenthalpic or isoenthalpic phase change occurs altering the conditions of temperature and/or pressure.

Then, as shown in box 116, step (d), the mineral filler in nanometric scale is subsequently subjected to contact with a scavenging agent 106 that reacts with the water and other compounds containing hydroxyl groups confined within layers and exposed after mineral filler exfoliation by subjecting the swollen inorganic filler for endoenthalpic or isoenthalpic phase change.

Preferably, the endoenthalpic or isoenthalpic phase change occurs in the presence of the scavenging agent.

Then, as shown in box 118, step (e), the mineral filler from scavenging step is newly dried with an inert gas 102 for remove sub-products 108 from scavenging agent and catalyst poisons. Preferably the drying step in box 118 occurs at same conditions and same equipment then the step described in box 110.

Figure 2:
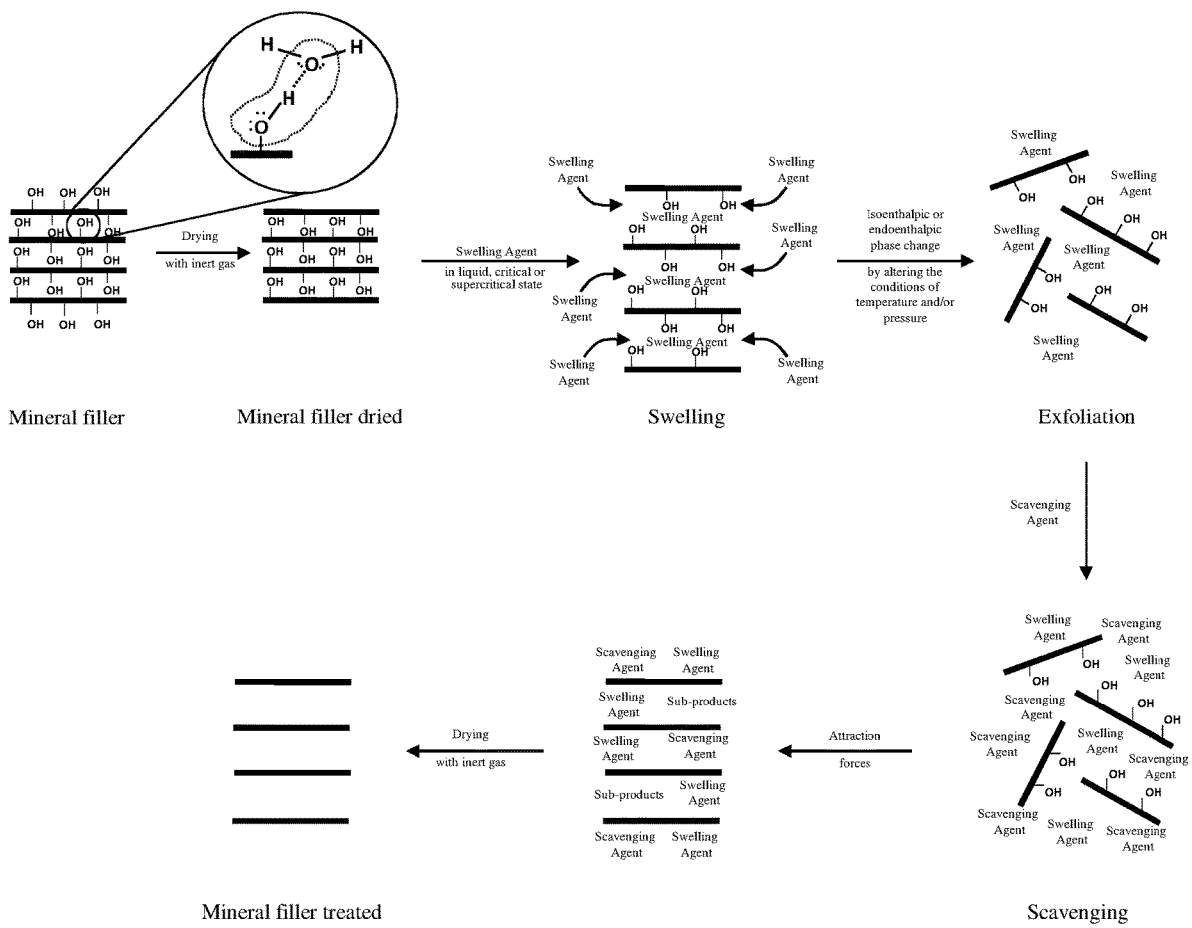
FIG. 2 depicts a schematic illustration of a process for processing mineral filler in accordance with one aspect of the present inventions.

FIG. 2 depicts a schematic illustration of a mineral filler (in natural state or organically modified) subjected to the treatment process of the present invention.

Firstly, the mineral filler is dried at ambient or high temperature and positive or vacuum pressure, using an inert gas in a dynamic drying system.

Then, the dried mineral filler is swelling in a continuous or batch stirred reactor, by a swelling agent being the said swelling agent confined within mineral filler layers.

Subsequently the swelling agent confined within mineral filler is subjected to endoenthapic or isoenthalpic phase change to disrupt the layered structure (exfoliation process).

In the exfoliation, the catalyst poison, as water and other compounds containing hydroxyl groups are exposed in the presence of a scavenging agent.

The scavenging agent reacts with water and other compounds containing hydroxyl groups, firstly confined within mineral filler layers, exposed by the mineral filler layers exfoliation acting as a chemical treatment.

Then, the attraction forces re-approximate the layers reducing the distance between mineral filler surfaces.

The mineral filler after the chemical treatment with a scavenging agent is dried using an inert gas at ambient or high temperature and positive or vacuum pressure in a dynamic drying system to remove the sub-products from reaction between scavenging agent and the catalyst poisons obtaining the processed (treated) mineral fillers.

In a more preferred embodiment, the process for treatment nanoparticles of mineral filler for obtaining processed nanoparticles for use in polymerization process in according to the present invention comprises the steps of:

(a) Subjecting a mineral filler to a thermal treatment at a temperature range of 20 to 160 deg. C., preferably between 100 and 120 deg. C., at a pressure range of from 0 to 16,000 mmHga, preferably between 0 and 740 mmHga, for a period of time varying between 2 and 24 hours, preferably from 4 to 8 hours, in the presence of an inert gas, using a dynamic drying system as a fluidized bed dryer, rotary dryer, rolling bed dryer or similar system able to provide an efficient drying of the filler.

(b) Feeding a first reactor selected from continuous or batch stirred flow reactor, preferably a reactor of CSTR type (Continuous Stirred Tank Reactor) with the dry mineral filler and a swelling agent at a ratio of 50 to 1000% by weight, preferably, 100 to 200% by weight of swelling agent in relation to the mineral filler. Subjecting the first reactor to temperature and pressure conditions whereby the swelling agent is in liquid state or near the critical point or in supercritical state, such conditions being dependent on the selected swelling agent. The time of contact of the mineral filler with the swelling agent within the reactor varies from 1 to 10 hours, preferably, between 2 and 6 hours.

(c) The mixture is transferred to a second reactor selected from continuous or batch stirred flow reactor or a fluidized bed reactor. During the transfer of swollen filler from the first reactor to the second reactor occurs a depressurization of the mixture with sudden vaporization of the swelling agent and obtainment of nanometric structures of the inorganic filler.

(d) During step (c), a scavenger is added in the reactor with the exfoliated mineral filler. The time of contact of the exfoliated mineral filler with the scavenging agent within the reactor varies from 0.1 to 600 minutes, preferably between 30 to 120 minutes. The said scavenging agent was added in an amount of 1 to 50% by weight based on the weight of the mineral filler, preferably in an amount of 1 to 20% by weight based on the weight of the mineral filler. Alternatively, the scavenging agent may be added with the swelling agent on the first reactor.

(e) The mineral filler obtained in step (d) is subjected to a thermal treatment at a temperature range of from 20 to 160 deg. C., preferably, between 20 and 80 deg. C., at a pressure range of from 0 to 1600 mmHga, preferably, between 0 and 760 mmHga, for a period of time varying between 0.5 and 12 hours, preferably, from 0.5 to 2 hours, in the presence of inert gas, using a dynamic drying system as a fluidized bed dryer, or rotary dryer, or rolling bed dryer or similar system able to provide an efficient drying of the filler. Alternatively, after the scavenging step, the mineral filler may be used in a polymerization reaction to obtain nanocomposites by in situ polymerization. According with the present invention, the mineral filler subjected to treatment may be in natural state or organically modified, and may be spherical-like or sheet-like (layered) fillers. In case of the spherical fillers the same may be selected from metal oxides, such as ZnO, CdO, Ca2O, TiO2, Al2O3, SiO2, Fe3O4; CaCO3 silver particles, among others. The sheet-like fillers may be hydrophilic or organophilic natural or synthetic phyllosilicates, kaolinites, graphite, among others. The mineral filler may be also selected from graphene and carbon nanotube. The mineral filler grain size does not necessarily have to be in nanometric scale, due to the fact that the process according to the present invention is capable of exfoliating the layers at the nanometric level.

In case of the phyllosilicates, the same may be modified or not with intercalated cations (organics surfactant), for example, any quaternary onium ion (cations) such as ammonium, phosphonium, sulphonium or the mixture with an onium ion exhibiting one or more alkyl chains (C12 to C18), there will be observed an excellent chemical affinity with the hydrocarbons saturated or unsaturated, and furthermore, the phyllosilicate will evidence greater basal spacing compared with the natural phyllosilicates, thereby facilitating an enhanced dispersion of the hydrocarbons saturated or unsaturated in those spaces, leading to an efficient swelling of the sheet-like mineral filler.

However, the time of contact required between the swelling agent and the mineral filler depends on the type of the filler and grain size characteristics of the mineral.

The scavenging agent of the present invention is selected from the group that comprises organometallic compound or a metallic hydride, preferably an alykylaluminium or an alkylaluminoxane, more preferably, an alkylaluminium or methylaluminoxane.

In other embodiment of the invention, the scavenging agent is the same co-catalyst used in the polymerization reaction.

The scavenging agent may also have the general formula I, II, Ill. IV, V or VI.

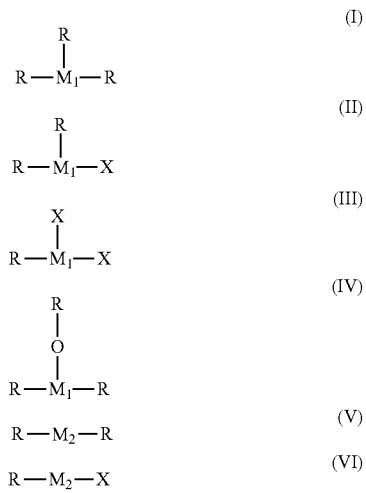

Wherein:
M1 is Al or B;
M2 is Zn or Mg;
R is hydrocarbyl group between 1 to 8 carbons or hydrogen;
X is Cl, I or O.

The inert gas for dry the mineral filler in the present invention is selected from nitrogen and saturated hydrocarbon, including C1-4 (methane, ethane, propane and butane). Preferably, there is employed nitrogen or methane. The swelling agent of the present invention is selected from saturated or unsaturated hydrocarbons. Preferably, there are employed ethane, propane, butane, pentane, hexane, heptanes, octane, propylene, 1-butene, 1-pentene, 1-hexene, 1-octene, among others. The said swelling agent is preferably the same monomer used in the polymerization reaction media or an inert compound comprised in the reactor media.

EXAMPLES

Example 1

The Effect of Nanofillers on Catalyst Yield in Polymerization Process

Organophilic montmorillonite (Nanocor I.44P) was dried in a rotary dryer with nitrogen at 90 deg. C. for 6 hours. The dried montmorrilonite was transferred to a stirred reactor. Propylene was added and stirred at 20 deg. C. and 42 kgf/cm2. for 4 hours. The ratio of swelling agent: inorganic filler was 50/50 by weight. After being stirred for 4 hours, the mixture was transferred at a flow rate of 500 g/h to a continuous stirred reactor. During the transfer the mixture of montmorrillonite/propylene occurred a despressurization. The pressure drop between the stirred reactors was 27 kgf/cm2, and the temperature increased to 130 deg. C. During the despressurization propylene was added in the second stirred reactor. The ratio of swelling agent: inorganic filler was 92/8 by weight. The residence time of the mixture was kept in 210 minutes. Concomitantly, the mixture was transferred to a continuous fluidized bed gas phase reactor for polymerization. The polymerization occurred using Ziegler-Natta catalyst, triethylaluminium, diisopropyldimethoxysilane and hydrogen at 80 deg. C. and 12 kgf/cm2.

Table 1 shows the results obtained in the polymerization according the method of Example 1 and the polymerization, at same condition, without montmorillonite (comparative Example 1)

TABLE 1

|  | Example 1 | Comparative Example 1 |
| --- | --- | --- |
| wt % Montmorrillonite | 3.32 | 0.00 |
| Catalyst yield (kgPP/gcat) | 1.45 | 8.50 |

As shown in Table 1 the catalyst yield reduced, at same polymerization condition, in 83% when the polymerization occurs in the presence of nanoparticles subjected to the conventional treatment.

Example 2

The Effect of the Nanofillers of the Present Invention on Catalyst Yield in Polymerization Process Organophilic montmorillonite (Nanocor I.44P) was dried in a rotary dryer with nitrogen at 90 deg. C. for 6 hours. The dried montmorrilonite was transferred to a stirred reactor. Propylene was added and stirred at 20 deg. C. and 42 kgf/cm2. for 4 hours. The ratio of swelling agent: inorganic filler was 50/50 by weight. After being stirred for 4 hours, the mixture was transferred at a flow rate of 500 g/h to a continuous stirred reactor. During the transfer the of the mixture of montmorrillonite/propylene occurred a despressurization. The pressure drop between the stirred reactors corresponded to 27 kgf/cm2, and the temperature increased to 130 deg. C. During the despressurization propylene was added in the second stirred reactor. The ratio of swelling agent: inorganic filler was 92/8 by weight. The scavenging agent used was triethylaluminium. The ratio of scavenging agent: inorganic filler was 15/85 by weight. The residence time of the mixture was kept in 210 minutes. Concomitantly, the mixture was transferred to a continuous fluidized bed gas phase reactor for polymerization. The polymerization occurred using Ziegler-Natta catalyst, triethylaluminium, diisopropyldimethoxysilane and hydrogen at 80 deg. C. and 12 kgf/cm2.

Table 2 shows the results obtained in the polymerization according the method of Example 2 and the polymerization, at same condition, without montmorillonite (comparative Example 2)

TABLE 2

|  | Example 2 | Comparative Example 2 |
| --- | --- | --- |
| wt % Montmorrillonite | 4.12 | 0.00 |
| Catalyst yield (kgPP/gcat) | 5.56 | 10.30 |

As shown in Table 2 the catalyst yield reduced, at same polymerization condition, in 46% when the polymerization occurs in the presence of nanoparticles subjected to the process of treatment of the present invention.

Example 3

Nanofillers Treatment with Scavenging Agent 5.8 g of organophilic montmorilonite (Nanocor I.44P) was dried in a fluidized dryer with nitrogen and triethylaluminum. The ratio of mineral filler:triethylaluminium was 5:1 by weight. The dried montmorillonite was transferred to a stirred reactor for polymerization. 650 g of propylene was added with a Ziegler-Natta, triethylaluminium, diisopropyldimethoxysilane and hydrogen. The polymerization occurred at 70 deg. C. and 30 kgf/cm2 for 1 hour. The reaction yielded 116 g with a clay content 2.44 wt %.

Example 4

Nanofillers Treatment with Swelling Agent 1.72 g Organophilic montmorrilonite (Nanocor I.44P) was dried in the same condition at the Example 3. The dried montmorrillonite was transferred to a stirred reactor. 300 g of propylene was added and stirred at 110 deg. C. and 66 kgf/cm2 for 5 hours. The mixture of montmorrillonite/propylene was transferred to a second stirred reactor for polymerization. During the transfer the swollen mixture occurred a despressurization. The pressure drop between stirred reactors was 65 kgf/cm2. Polymerization occurred at same condition as in the Example 3. The reaction yielded 75 g with a clay content 2.24 wt %.

Example 5

Nanofillers Treatment with the Process Provided in the Present Invention 5.0 g Organophilic montmorrilonite (Nanocor I.44P) was dried in the same condition at the Example 3. The dried montmorrillonite was transferred to a stirred reactor. 500 g of propylene was added and stirred at 124 deg. C. and 92 kgf/cm2 for 1 hour. The mixture of montmorrillonite/propylene was transferred to a second stirred reactor for scavenging and subsequently polymerization. During the transfer the swollen mixture occurred a despressurization. The pressure drop between stirred reactors was 90 kgf/cm2. Subsequently was added and stirred triethylaluminium and 650 g of propylene at ambient temperature for 40 minutes. The ratio of mineral filler: scavenging agent was 50:1 by weight. Polymerization occurred at same condition as in the Example 3. The reaction yielded 150 g with a clay content 2.23 wt %.

Shows in Table 3 the results obtained in the polymerization according the method of Example 3, 4 and 5 and the polymerization condition, without montmorrillonite (comparative Example 3).

TABLE 3

|  | Example 3 | Example 4 | Example 5 | Comparative Example 3 |
|---|---|---|---|---|
| wt % Montmorrillonite | 2.44 | 2.24 | .2.23 | 0.00 |
| Catalyst yield (kgPP/gcat) | 25.0 | 7.5 | 16.0 | 35.0 |
| Exfoliation | No | Yes | Yes | — |

As shown in the Table 3 the scavenging step subsequently to the exfoliation occurred by phase change in Example 5 reduced the catalyst deactivation comparing to Example 4. At same time, the results show that the exfoliation in Example 4 increased the catalyst deactivation comparing to Example 3.

Figure 3:
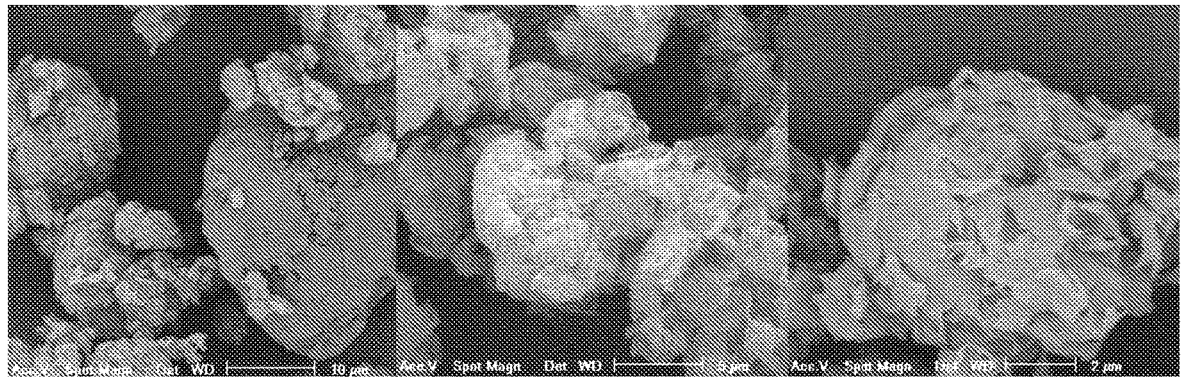
FIG. 3 is an illustration by means of electronic transmission microscopy, showing the layers of the organophilic phyllosicate before treatment process.

FIG. 3 shows transmition electron microscopy images of the organophilic montmorrillonite subjected a conventional treatment in dynamic dryer using nitrogen as inert gas at high temperature.

Figure 4:
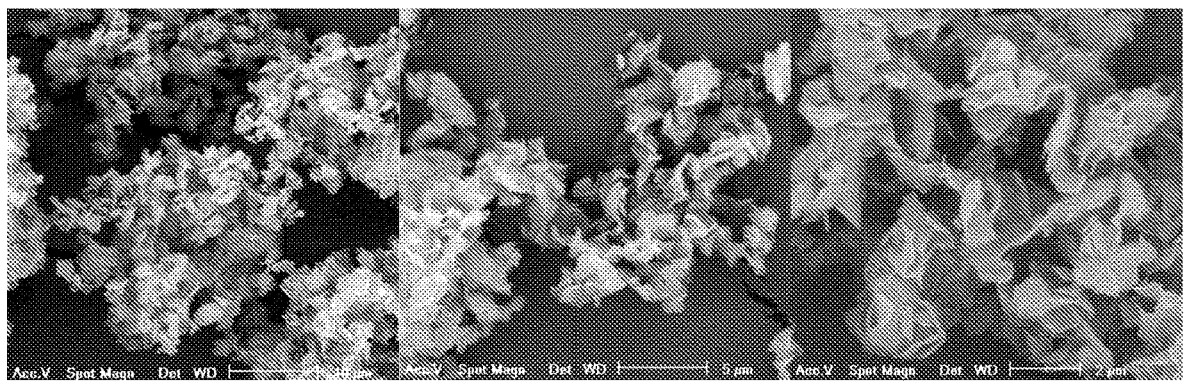
FIG. 4 is an illustration provided by means of electronic transmission microscopy, showing the layers of the organophilic phylloslicate after submitted to the treatment process as described in the present invention.

FIG. 4 shows transmition electron microscopy images of the organophilic montmorrillonite subjected a treatment described in the present invention.

What is claimed is:

1. A process for treatment of nanoparticles of a mineral filler, which comprises the steps of:
   a. Drying a mineral filler with an inert gas;
   b. Mixing the dried mineral filler obtained in step (a) with a swelling agent in a liquid state, or near a critical state or in a supercritical state;
   c. Subjecting the swelling agent of the mixture obtained in step (b) to an endoenthalpic or isoenthalpic phase change, by altering the conditions of temperature and/or pressure; and
   d. Subjecting the mixture obtained in step (c) to contact with a scavenging agent, wherein the scavenging agent has the general formula I, II, III, IV, V or VI:

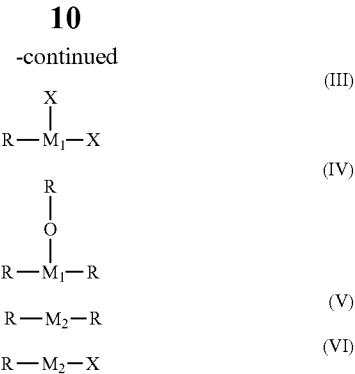

wherein:

$M_1$ is Al or B;

$M_2$ is Zn or Mg;

R is a hydrocarbyl group between 1 to 8 carbons or hydrogen; and

X is Cl, I, O, and wherein the scavenging agent binds to water and other hydroxyl-containing compounds in the mineral filler, and removes the water and other hydroxyl-containing compounds from the mineral filler.

2. The process as claimed in claim 1, wherein step (a) occurs in a temperature range of 20 to 160° C., at a pressure range of from 0 to 16,000 mmHga, for a period of time varying between 2 and 24 hours.

3. The process as claimed in claim 1, wherein step (a) occurs using a dynamic drying system selected from the group consisting of a fluidized bed dryer, a rotary dryer and a rolling bed dryer.

4. The process as claimed in claim 1, wherein step (b) occurs in a continuous or batch process.

5. The process as claimed in claim 1, wherein step (b) is conducted in a stirred reactor.

6. The process as claimed in claim 1, wherein the step (b) duration varies between 1 and 10 hours.

7. The process as claimed in claim 1, wherein step (c) occurs in the presence of a scavenging agent.

8. The process as claimed in claim 1, wherein in step (c) the endoenthalpic or isoenthalpic phase change occurs by transferring the mixture containing the mineral filler and the swelling agent to a second reactor.

9. The process as claimed in claim 8, wherein the second reactor is selected from the group consisting of a CSTR type reactor, a continuous or batch stirred flow reactor and a fluidized bed reactor.

10. The process as claimed in claim 1, wherein step (d) occurs in a polymerization reactor.

11. The process as claimed in claim 1, wherein in step (d) the time of contact of the mineral filler with the scavenging agent varies from 0.1 to 600 minutes.

12. The process as claimed in claim 1, wherein the mineral filler obtained in step (d) is dried with an inert gas in a step (e).

13. The process as claimed in claim 12, wherein step (e) is carried out using the same inert gas and same conditions used in step (a).

14. The process as claimed in claim 1, wherein the mineral filler is a sheet-like (layered) filler or spherical-like filler.

15. The process as claimed in claim 14, wherein the spherical-like mineral filler is selected from the group consisting of ZnO, CdO, $Ca_2O$, $TiO_2$, $Al_2O_3$, $SiO_2$, $Fe_3O_4$, $CaCO_3$ and silver particles.

16. The process as claimed in claim 15, wherein the sheet-like mineral filler is selected from the group consisting of hydrophilic or organophilic natural or synthetic phyllosilicates, micas, kaolinites and graphite.

17. The process as claimed in claim 1, wherein the mineral filler is graphene.

18. The process as claimed in claim 1, wherein the mineral filler is a carbon nanotube.

19. The process as claimed in claim 1, wherein the inert gas is nitrogen or a saturated hydrocarbon.

20. The process as claimed in claim 19, wherein the saturated hydrocarbon is methane, ethane, propane or butane.

21. The process as claimed in claim 1, wherein the swelling agent is a saturated or unsaturated hydrocarbon.

22. The process as claimed in claim 21, wherein the swelling agent is selected from the group consisting of ethane, propane, butane, pentane, hexane, heptanes, octane, propylene, 1-butene, 1-pentene, 1-hexene and 1-octene.

23. The process as claimed in claim 1, wherein the swelling agent is added in an amount of 50 to 1000% by weight based on the weight of the mineral filler.

24. The process as claimed in claim 1, wherein the scavenging agent is added in an amount of 1 to 50% by weight based on the weight of the mineral filler.

\* \* \* \* \*